United States Patent Office 3,577,318
Patented May 4, 1971

3,577,318
PROCESS FOR MAKING 6-HYDROXY-3-KETO
Δ⁴-STEROIDS OF THE PREGNANE AND
ANDROSTANE SERIES
Klaus Kieslich, Berlin, and Wolfgang Koch, Darmstadt-Arheilgen, Germany, assignors to Schering Aktiengesellschaft, Berlin, Germany
No Drawing. Filed Jan. 28, 1970, Ser. No. 12,877
Claims priority, application Germany, Jan. 27, 1969,
P 19 04 543.3
Int. Cl. C07c *167/14*
U.S. Cl. 195—51                               3 Claims

ABSTRACT OF THE DISCLOSURE 6-hydroxy-3-keto-Δ⁴-steroids of the pregnane or androstane series are made by fermenting a 3β-hydroxy or 3β-acyloxy-5,6-epoxy steroid of the pregnane or androstane series which is saturated in the A-ring with bacteria of the genus Flavobacterium of Pseudomonas, or enzymes thereof.

BACKGROUND OF THE INVENTION

Experiments have already been carried out to test the action of microorganisms on substrates which include a 3β-hydroxy-5,6-epoxy groups; see S. S. Lee and Ch. J. Shi/Biochem. 3 1267 (1964). These tests indicated that the resulting products were predominantly products having a 9,10-seco-structure.

It was therefore most surprising that 6-hydroxy-3-keto-Δ⁴-steroids could be made in industrially acceptable yields and in smoothly proceeding reactions by using specific types of microorganisms identified below.

SUMMARY OF THE INVENTION

According to the invention, 6-hydroxy-3-keto-Δ⁴-steroids of the pregnane and androstane series are made by fermenting a 3β-hydroxy or 3β-acyloxy-5,6-epoxy steroid of the pregnane or androstane series which is saturated in the A-ring with bacteria of the genus Flavobacterium or Pseudomonas, or enzymes thereof.

DESCRIPTION OF THE PREFERRED EMBODIMENTS

Among the above-identified genera of microorganisms, the preferred species are *Flavobacterium dehydrogenans* or *Pseudomonas fluorescens*.

It is essential for the process of the invention that the steroid used as starting product has a 3β-hydroxy- or 3β-acyloxy-group and additionally has an α- or β-oriented 5,6-epoxy ring. In addition, it may have various substituents which are more or less a matter of choice. For instance, the steroid may have free or functionally modified hydroxyl groups, for instance in the 11α, 11β, 14α, 15α, 16, 17 and/or 21-position. It may also have lower alkyl groups, for instance in the 7α, 16 and/or 18-position, free or functionally modified keto groups, for instance in the 11 and/or 17 or 20-position or halogen atoms, preferably chlorine or fluorine, for instance in the 16-position. The steroid may also include additional double bonds, for instance in the 7-,9(11)-, 14(15)- and/or 16-position.

The 6-hydroxyl group which is introduced by the process of the invention may be α- or β-oriented depending on the 5,6 epoxy ring.

The microbiological conversion of the starting products may be carried out, for instance, in the following manner. By preliminary tests there are, in the first place, ascertained the optimum fermentation conditions such as the selection of a suitable nutritive medium, a suitable substrate solvent, the preferable substrate concentration, the technical conditions such as temperature, airing, pH, stirring, and the optimum times for germination and addition of the substrate, as well as the most favorable contact time. All these elements are determined analytically, particularly by thin-layer chromatography.

Upon completion of the fermentation, the reaction product is extracted from the culture broth with a suitable organic solvent, and is isolated from the extract, for instance, by means of evaporation concentration and conventional purification methods such as recrystallization and/or chromatography.

There are thus obtained 6-hydroxy-3-keto-Δ⁴-steroids of the pregnane and androstane series. An example of the products obtained is 6α-hydroxy-testololactone.

Another example of the products of the invention is 6α,21-dihydroxy-16α-methyl-4-pregnene-3,20-dione.

The process of the invention thus is a technically facile method for making 6-hydroxy-3-keto-Δ⁴-steroids of the pregnane and androstane series.

These compounds are valuable intermediates for making compounds having hormonal activity. For instance, they may be easily dehydrated to form the corresponding 3-keto-Δ⁴,⁶-steroids which in turn can be readily converted into the corresponding 5,6-epoxy compounds by means of a reaction with a peracid. The epoxy compounds can readily be converted to the corresponding 6-halogeno-3-keto-Δ⁴,⁶-steroids by reaction with a hydrogen halide.

By this type of synthesis it is possible to make hormone compounds of a strong progestational activity such as the 6-chloro-17α-acetoxy-4,6-pregnadiene-3,20-dione ("Chlormadinone") or 6-chloro-17α-acetoxy-1,2α-methylene-4,6-pregnadiene-3,20-dione ("Cyproteronacetate").

Some of the 6-hydroxy compounds made by the process of the invention also are known to have valuable pharmaceutical properties. Examples are the anobolically active 6β-hydroxy-testololactone (U.S. Pat. No. 3,058,889) and the 6β-hydroxy-prednisone, which has an anti-inflammatory action (German published application No. 1,095,278).

MAKING OF THE STARTING PRODUCT

As has been indicated, the starting product is a 3β-hydroxy- or 3β-acetoxy-epoxy-steroid. These steroids in turn are made from the corresponding 3β-hydroxy- or 3β-acyloxy-Δ⁵-steroids which are subjected to an epoxidation of the Δ⁵-double bond, for instance by means of peracids.

The following will illustrate the making of the starting product by means of a specific example.

60 g. of 3β-hydroxy-21-acetoxy-16α-methyl-5-pregnane-20-one were dissolved in 1.8 l. of dry methylene chloride and reacted with 12 g. sodium acetate (in melted condition), and 40 g. of sodium sulfate (desiccated). At 20° C., 36 ml. of peroxyacetic acid were then added dropwise while stirring during a time of 30 minutes. Thereafter, 12 g. of sodium acetate and 14 g. of sodium sulfate were again added and 36 ml. of peroxyacetic acid were again added dropwise during the same period of time as previously. The mass was then subjected to further stirring causing the solution to warm up to room temperature during the course of two hours.

After neutralization with 1 liter of a 5% NaHCO₃ solution, while stirring, separation of the methylene chloride was then effected and the solution was washed with water, FeSO₄ solution, and then again water, and then was dried over Na₂SO₄ and concentrated in vacuo at 40° C. The residue was subjected to recrystallization from acetic acid ester. There was thus obtained 3β-hydroxy-21-acetoxy - 5α,6α - epoxy - 16α-methyl-pregnane-20-one, melting point 167–169° C. Yield: about 85%.

If 3-acetates were desired, they could be obtained by epoxidation of the analogous Δ⁵-3-acetates or also by subsequent acetylation of the 3β-hydroxy-5α,6α-epoxy compounds.

The following examples will further illustrate the invention.

EXAMPLE 1

A conical flask was filled with 500 ml. of sterilized aqueous medium. The medium contained 0.3% yeast extract, 0.5% corn steep liquor and 0.2% starch. The mass was adjusted to a pH of 7.0. It was then inoculated with a lyophilized culture of *Flavobacterium dehydrogenans* and was subjected to shaking for 48 hours at 30° C. and 145 r.p.m. A 20 l. fermenter was then charged with 14.75 l. of a sterilized nutrient medium of the same composition and was inoculated with 250 ml. of the above-described bacterial suspension. The mass was subjected to shaking for 24 hours at 29° C. while airing with 1650 l. per hour at 220 r.p.m.

0.9 liter of this preliminary fermentation were transferred to a 20 liter fermenter, which was charged with 15 liter of a sterilized medium of the same composition. The principal fermentation mass was then subjected to the same procedure as employed in the preliminary fermentation. The pH value during the principal fermentation was maintained between 6 and 7. After an initial phase of 6 hours, 3.75 g. of 3β-hydroxy-5β,6β-epoxy-testololactone in 80 ml. dimethylformamide were added and subjected to fermentation. The course of the reaction was traced by thin-layer chromatography of methylisobutylketone extracts of individual specimens. The complete conversion of the starting material was effected after 28 hours.

The culture was then stirred with methylisobutylketone and the extract was concentrated at a maximum bath temperature of 40° C. in a vacuum until dry. The residue was washed with a small amount of cold hexane and there was thus obtained, after drying, 3.2 g. of a crude product which furnished 2.1 g. (58% of the thus-refined yield) of 6β-hydroxy-testololactone after recrystallization from acetic ester/methanol and acetic ester/isopropylether. Melting point between 222 to 224° C.; $\epsilon_{234}=10,200$.

EXAMPLE 2

6α,21-dihydroxy-16α-methyl-4-pregnene-3,20-dione

Following the procedure of Example 1, the following fermentation was carried out. However, the principal fermentation medium in this case had a composition including 1% yeast extract and 0.77% $KH_2PO_4$. Using this medium, 7.5 g. of 3β-hydroxy-21-acetoxy-5α,6α-epoxy-16α-methyl-pregnane-20-one dissolved in 100 ml. dimethylformamide were fermented in 15 liters of a culture broth of *Flavobacterium dehydrogenans*. After 33 hours of contact time, the reaction was complete. After the conventional further processing, described also in Example 1, 3.2 g. of crude product was obtained which was recrystallized from acetic acid ester. The final product had a melting point of 177/179–181° C.; $\epsilon_{239}=14,890$.

EXAMPLE 3

6α-hydroxy-testololactone

Following again the procedure of Example 1, 3.75 g. of 3β-hydroxy-5α,6α-epoxy-testololactone dissolved in 80 ml. dimethylformamide were subjected to fermentation in 15 l. culture broth of *Flavobacterium dehydrogenans*. The reaction was complete after 25 hours. After the usual further processing, a crude product was obtained which was recrystallized from acetic acid ester and acetic acid ester/methanol. There were obtained 2 g. of 6α-hydroxy-testololactone; M.P. 264/266–272° C.; $\epsilon_{238}=15,700$.

EXAMPLE 4

6α-hydroxy-4-androstene-3,17-dione

A lyophilized culture of *Pseudomonas fluorescens* (Biologische Bundesanstalt Berlin) was introduced in 20 ml. of a sterile aqueous medium containing 0.5% glucose, 0.5% yeast extract and 0.2% cornsteep liquor. The medium was adjusted to a pH of 7. The mass was then subjected to shaking for 48 hours at 38° C. 2 ml. of the bacterial suspension were then transferred to a conical flask which contained 20 ml. of the same medium. After 24 hours, 2 ml. of the culture broth were transferred to 100-ml. conical flask which contained 20 ml. of the same medium. After 6 hours' shaking, 4 mg. 3β-hydroxy-5α,6α-epoxy-androstane-17-one in 0.2 ml. dimethylformamide were added and subjected to further shaking for another 42 hours at 30° C.

The fermentation broth was then shaken with methylisobutylketone. An extract specimen was subjected to thin-layer chromatography and was assessed against comparison standard substance which was 6α-hydroxy-4-androstene-3,17-dione ($R_F$ 0.43 benzene:acetic acid ester 1:4 on silica gel layers after Stahl. There were obtained about 60% of reaction product.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of making 6-hydroxy-3-keto-$\Delta^4$-steroids of the pregnane or androstane series, comprising fermenting a 3β-hydroxy- or 3β-acyloxy-5,6-epoxysteroid of the pregnane or androstane series which is saturated in the A-ring with bacteria of the genus Flavobacterium or the genus Pseudomonas.

2. The process of claim 1, wherein the bacteria belong to the species *Flavobacterium dehydrogenans*.

3. The process of claim 1, wherein the bacteria belong to the species *Pseudomonas fluorescens*.

References Cited

UNITED STATES PATENTS 3,431,173  3/1969  Waard et al. _____ 195—51

OTHER REFERENCES

Lee et al.: Biochemistry, vol. 3, pages 1267–1271 (1964).

ALVIN E. TANENHOLTZ, Primary Examiner

U.S. Cl. X.R.

260—343.2, 397.47